T. L. SHAW.
Railroad Snow-Plow.
No. 97,971.
Patented Dec. 14, 1869.
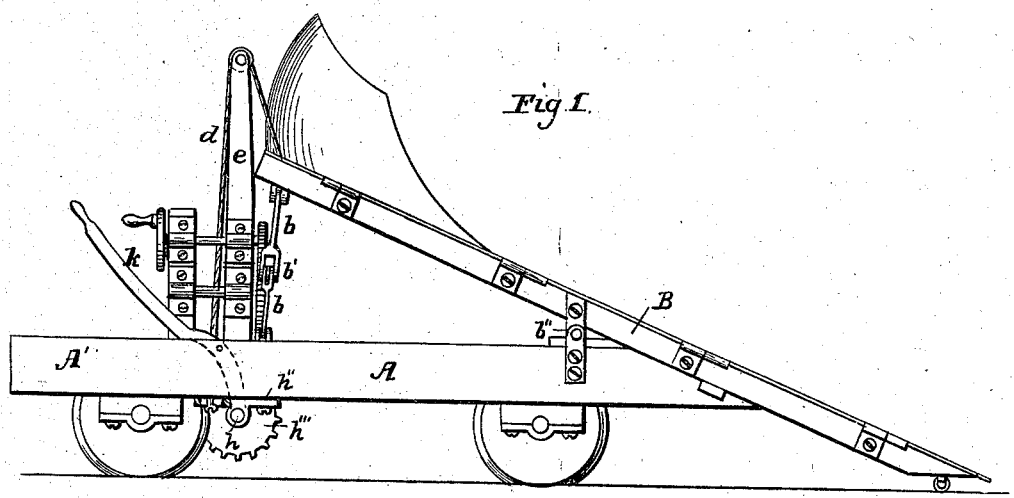
Fig. 1.
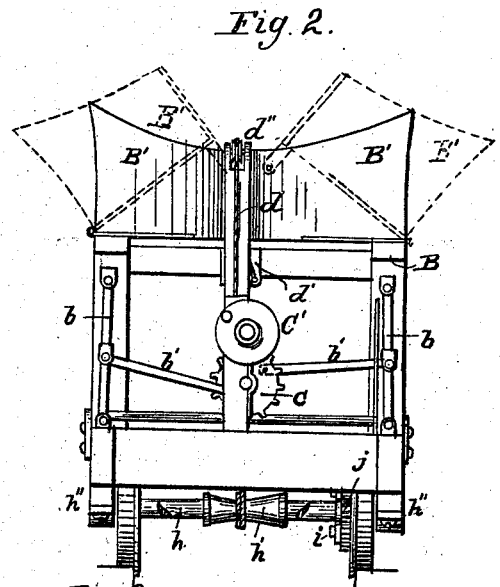
Fig. 2.
Witnesses:   Fig. 3.   Inventor:
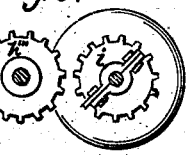

United States Patent Office.

THOMAS L. SHAW, OF OMAHA, NEBRASKA.

Letters Patent No. 97,971, dated December 14, 1869.

---

IMPROVED SNOW-PLOW FOR RAILWAYS.

---

The Schedule referred to in these Letters Patent and making part of the same.

---

*To all whom it may concern:*

Be it known that I, THOMAS L. SHAW, of Omaha, in the county of Douglas, and State of Nebraska, have invented a new and improved Snow-Plow; and I do hereby declare that the following is a full, clear, and exact description of the construction and operation of the same, reference being had to the accompanying drawings, making a part of this specification, in which—

Figure 1 is a side elevation;

Figure 2, a transverse vertical section, taken just in front of the toggle-levers; and Figure 3 is a detached view of the divided pinion on the engine-axle.

This invention relates to a snow-plow for a locomotive-engine, which takes up a load of snow, is then borne back out of the cut by the engine, and dumps its load when arrived at a clear space.

The invention consists of a double-leafed plow, constructed so as to dump its load to each side; the framework of said plow being pivoted, transversely of its truck, in such a manner that it may be made to assume a horizontal posture after having, in its inclined position, been forced into a field or drift of snow, and thus take up a load and support it while the engine is running back, the leaves of the plow being connected by a two-branched cord or chain, passing over a pulley placed in the top of a pillar above the floor of the plow-truck, with a windlass beneath such floor, said windlass being fixed upon a shaft, bearing, near one end, a cog-wheel, and sustained at that end in a sliding box, in such manner that the cog-wheel may be slid into gear with a toothed pinion on the front axle of the locomotive, and therefrom derive the motion requisite to lift, by means of said chain or cord, the two leaves of the plow, and thus cause them to dump their load; the toothed pinion on the locomotive-axle being made in two pieces, connected by bolts, and capable of being removed from one axle, and fixed upon another.

In the drawings—

A is the plow-truck, and

A' is the front end of the locomotive-truck.

B is the plow-frame, the same being a simple rectangle, oblong in shape, and pivoted to the truck A, at b''.

In running forward, to clear the track of snow, the frame is inclined.

A toggle-lever, b, is pivoted at its upper extremity to each upper corner of the frame B, and at its lower extremity, to the truck A vertically beneath.

Bars b' connect the central joints of the toggle-levers with wrist-pins in the side of the toothed wheel C, in such a manner, that by rotating the crank-wheel C' in the proper direction, which crank-wheel is suitably connected by shafts, and gearing with the wheel C, the toggle-levers b b may be straightened out, or drawn together, thus lowering the upper end of the plow-frame, and drawing the latter from an inclined posture to a horizontal one, or the reverse.

The former operation is performed when it is desired to take up a load of snow upon the shovel, preparatory to running the engine back, for the purpose of delivering such load in a clear space.

The plow-frame B sustains two leaves, B' B', of sheet-metal, suitably braced and stayed, and hinged at their outer sides to the outer sides of the frame, the leaves being of sufficient width to wholly cover the frame.

On arriving at the clear space before spoken of, the leaves are lifted, in order to dump their load. Such lifting is effected by a two-branched cord, d, fastened at its lower end to handles d' d', projecting downward, one from the inner and upper corner of each leaf B'.

The cord d or chain passes over a sheave, d'', in the top of the pillar e, fixed in the truck-floor. The cord runs thence through the truck-floor, and is fastened, at its other extremity, to a windlass, h', on a shaft, h, placed transversely of the plow-truck, and sustained at its ends in boxes h'', affixed to the under surfaces of the side-beams of such truck.

One of the boxes h'' has slots in it, by means of which it is made to slide on its fastening-screws.

The shaft h sustains a cog-wheel, h''', which, owing to the adjustability of the shaft, may be thrown into or out of gear with the toothed pinion i of the locomotive-axle I.

A hand-lever, k, is the instrument by which to move the shaft h.

When the engine is running back, and the wheels h''' i are thrown into gear, the cord d is wound around the windlass h', and brings a strain upon the handles d', which at once lifts the leaves B', and causes them to dump their load.

The load discharged, and the wheels thrown out of gear, the leaves fall of their own weight.

The toothed pinion i is made in two parts, as shown in fig. 3, each part having a flange upon it, through which to pass the connecting-bolts. Thus the pinion may be readily taken off from one axle and fixed upon another, at pleasure.

The necessity of placing a pinion on each locomotive forward axle is thus obviated.

Having thus described my invention,

What I claim as new, and desire to secure by Letters Patent, is—

1. The pivoted plow-frame B, toggle-levers $b\ b$, connecting-bars $b'$, and rotating disk C, all constructed and arranged substantially as and for the purpose set forth.

2. The means herein described of operating the leaves $B'\ B'$ through the agency of the locomotive-wheels, substantially as and to the end specified.

3. The divided pinion $i$, toothed wheel $h'''$, shafts I $h$, and lever $k$, combined and arranged substantially as described.

To the above specification of my invention, I have signed my hand, this 12th day of October, 1869.

THOMAS L. SHAW.

Witnesses:
 CHAS. A. PETTIT,
 S. C. KEMON.